United States Patent [19]

Beghnini

[11] 3,854,618
[45] Dec. 17, 1974

[54] VACUUM PACKAGING
[76] Inventor: Gino P. Beghnini, 42 Rue d'Avron, 75020 Paris, France
[22] Filed: July 25, 1973
[21] Appl. No.: 382,483

[52] U.S. Cl. ................ 215/307, 215/311, 215/344, 220/38.5
[51] Int. Cl. .......................................... B65d 47/20
[58] Field of Search ............ 220/38.5, 44; 215/307, 215/311, 317, 343, 344, 345

[56] References Cited
UNITED STATES PATENTS

| | | | |
|---|---|---|---|
| 3,021,976 | 2/1962 | Tracy | 220/38.5 |
| 3,215,297 | 11/1965 | Acton | 215/343 |
| 3,239,112 | 3/1966 | Porcelli | 220/38.5 |
| 3,532,244 | 10/1970 | Yates | 215/344 |

FOREIGN PATENTS OR APPLICATIONS

| | | | |
|---|---|---|---|
| 1,068,574 | 11/1959 | Germany | 215/317 |
| 1,200,362 | 6/1959 | France | 220/38.5 |
| 1,545,591 | 5/1967 | France | 215/307 |

Primary Examiner—William I. Price
Assistant Examiner—Ro E. Hart

[57] ABSTRACT

A lid assembly moulded of plastics material for closing a container to be evacuated, the assembly comprising a lid having a portion defining an opening, a generally frusto-conical valve member for closing the opening, means hingedly connecting said valve member to said lid, gripping means connected to said valve member, inner and outer lips on said lid for engaging the edge of the opening of a container to be closed by the lid assembly, and first and second lips on said lid portion defining the opening, said first lip extending outwardly of the lid generally perpendicular to the general plane of the lid and said second lip extending generally parallel to the general plane of the lid inwardly of the opening.

8 Claims, 5 Drawing Figures

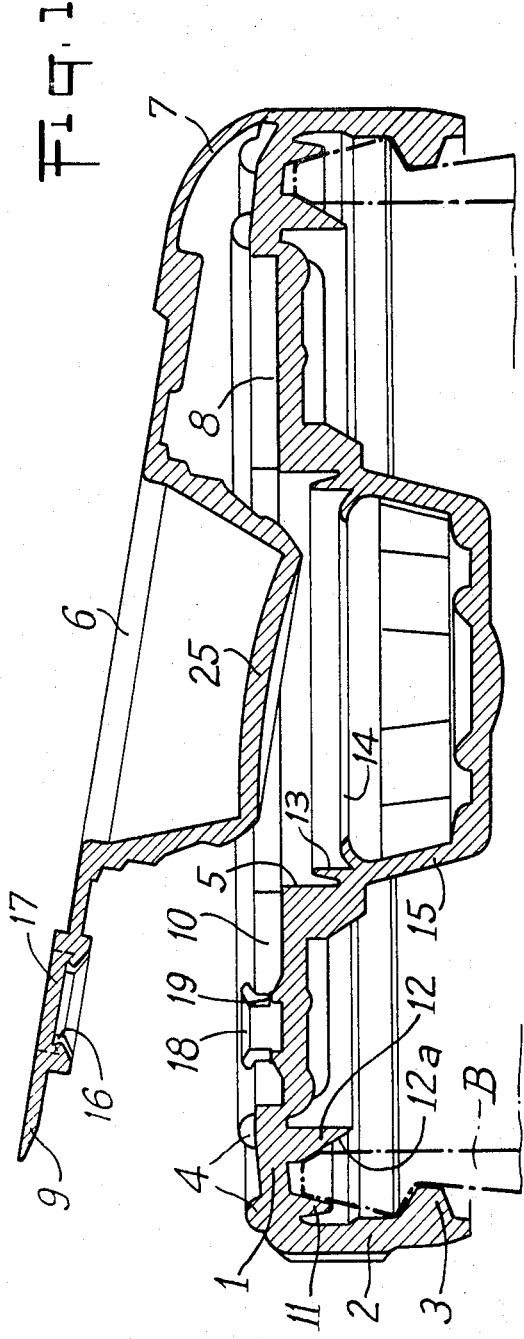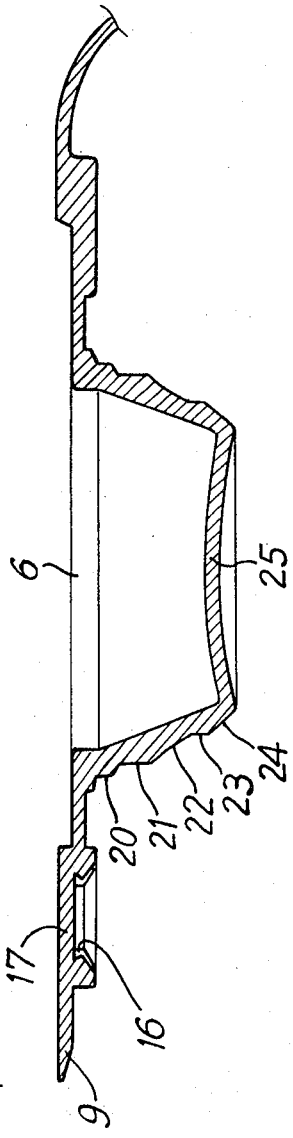

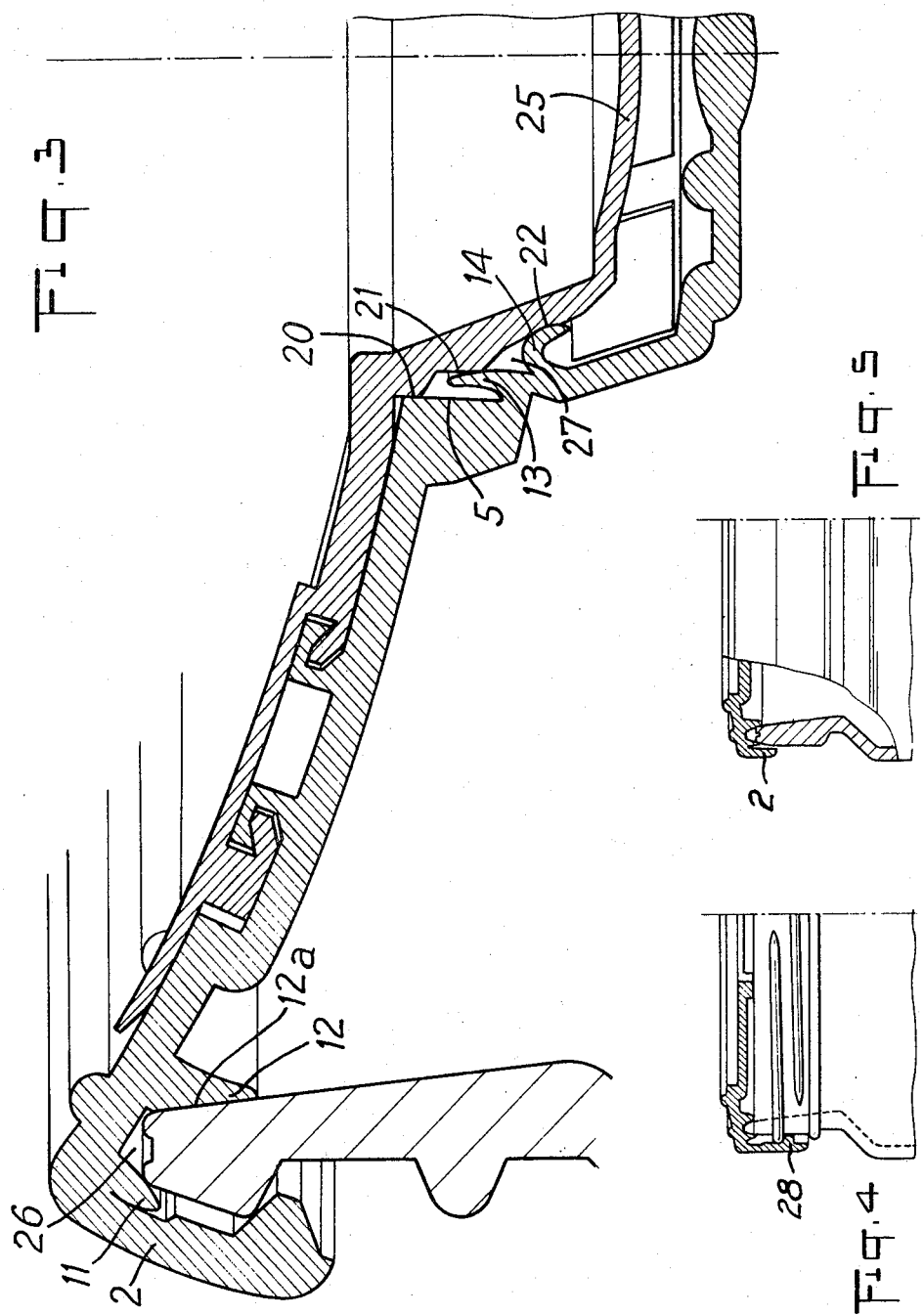

VACUUM PACKAGING

The present invention relates to vacuum packaging, for example of food products, and industrial materials, such as paints.

In such packaging, the evacuating facility demands that the container has a lid provided with a valve comprising an opening in the lid closed by a valve member which is attached to the lid by a hinged connection and can lift freely on evacuation but close the opening hermetically on return of the atmosphere externally of the container to atmospheric pressure.

Moreover, such a valve member, which only closes the opening under the influence of external pressure, must have sufficient dimensions not to lift at the least effort, and must close the opening sufficiently well to prevent entry of air into the container.

The object of the invention is to provide a lid which can be fitted fluid-tightly to a jar or other container, and which has an evacuation valve which is easily operable while ensuring perfect fluid-tightness. The lid, preferably of moulded plastics material, is rendered fluid-tight by atmospheric pressure applied to it when a vacuum has been formed in the container or jar.

According to the present invention, there is provided a lid assembly moulded of plastics material for closing a container to be evacuated, the assembly comprising:

i. a lid having a portion defining an opening;
ii. a generally frusto-conical valve member for closing the opening;
iii. means hingedly connecting said valve member to said lid;
iv. gripping means connected to said valve member;
v. inner and outer lips on said lid for engaging the edge of the opening of a container to be closed by the lid assembly; and
vi. first and second lips on said lid portion defining the opening, said first lip extending outwardly of the lid generally perpendicular to the general plane of the lid and said second lip extending generally parallel to the general plane of the lid inwardly of the opening.

Other features and advantages of the present invention will become apparent from the following description of an embodiment thereof, given by way of example only, with reference to the accompanying drawings.

In the drawings:

FIG. 1 is a sectional view of an embodiment of lid assembly in accordance with the invention, applied to a jar;

FIG. 2 is a sectional view of the valve member of the lid of FIG. 1;

FIG. 3 is a sectional view through half the lid assembly of FIG. 1, with vacuum established in the jar;

FIG. 4 is a sectional view of a modification of the lid of FIG. 1; and

FIG. 5 is a sectional view of another modification of the lid of FIG. 1.

The lid shown in FIGS. 1, 2 and 3 is of moulded plastics material and includes a main part 1 provided with a peripheral circular skirt 2 having an inwardly projecting bead 3 which in use engages under a bead on the neck of the jar B.

Part 1 of the lid is reinforced by stiffening ribs 4 and provided with a central opening 5 of a valve and which receives a valve member 6, of generally frusto-conical form, hingedly connected to the lid by a tongue 7. When the member 6 is positioned in opening 5, tongue 7 is received in a recess 8 in the part 1 and a gripping tab 9 connected to member 6 diametrically opposite tongue 7, is received in a recess 10 in the lid diametrically opposed to recess 8. Part 1 of the lid is provided with two internal peripheral lips 11 and 12 which in use bear on either side of the edge of the neck of the jar. Outer lip 11 is slightly spaced from the skirt 2 so as to be able to lie against it and lip 12 has an inclined face 12a on one side which bears on the neck edge and an axial face on the other side such that, under the effect of a pressure differential across the lid which draws the lid inwardly of the jar (see FIG. 3), face 12a is applied to the inner surface of the jar neck.

Opening 5 is cylindrical and has at its base, an axially directed lip 13 and a lip 14 extending substantially perpendicularly to lip 13. As shown the opening 5 is inwardly covered by a perforated bowl 15 which is designed to protect valve member 6 from shocks applied by the products contained in the jar.

The gripping tab 9 is provided with an eye 16 provided with a transverse bar 17. A nipple 18 provided in recess 10 is engaged in the eye 16 when the member 6 is received in opening 5, bar 17 being located in a groove 19 in the nipple. Valve member 6 comprises a first cylindrical portion 20 connected conically to a second cylindrical portion 21 of smaller diameter, followed by a frusto-conical portion 22 connected by a cylindrical portion 23 to a frusto-conical portion 24. The portion 24 is inclined at an angle of approximately 33° and is closed by a domed base 25, the concavity of the base facing inwardly of the jar.

When a vacuum has been established in the jar and the valve member is applied by the external pressure (see FIG. 3), cylindrical portion 20 plugs cylindrical opening 5 and cylindrical portion 21 is in contact with lip 13, which forms a seal therewith; lip 14 bends and is applied against conical portion 22, while base 25 becomes domed in the opposite direction, i.e., with the concavity facing outwardly.

The lid itself bends under the influence of the external pressure and face 12a of lip 12 is applied to the inner surface of the jar neck, while lip 11, pushed against skirt 2, is applied to the outer edge of the jar neck, leaving a chamber 26 above the edge of the jar neck. This chamber 26 is at a pressure intermediate the vacuum in the jar and the external pressure.

Chamber 27, which remains between lips 13 and 14 and portion 22 of the valve is also at a pressure intermediate the vacuum in the jar and the external pressure.

To form a vacuum in the jar, a suction head connected to a vacuum-pump is applied to the lid, or the jar with its lid is placed in a chamber in which a vacuum is formed. Under the influence of the suction, the valve member lifts and a vacuum is formed in the jar. As soon as pumping ceases, the valve member returns into opening 5 and, when the lid is subjected to atmospheric pressure, the valve member is firmly applied to close the opening, as shown in FIG. 3.

FIGS. 4 and 5 show modifications of the above-described lid, which have been adapted to the particular type of container to be closed thereby. In FIG. 4, bead 3 has been replaced by a thread 28, for a screw-necked container, while in FIG. 5, the bead of skirt 2 has been omitted, the lid being held on the container only by the effect of the external pressure.

The invention is not limited to the embodiment described and illustrated but, on the contrary, covers all its modifications within the spirit and scope of the invention.

What is claimed is:

1. A lid assembly moulded of plastics material for closing a container to be evacuated, the assembly comprising:
   i. a lid having a portion defining an opening;
   ii. a generally frusto-conical valve member for closing the opening;
   iii. means hingedly connecting said valve member to said lid;
   iv. gripping means connected to said valve member;
   v. inner and outer lips on said lid for engaging the edge of the opening of a container to be closed by the lid assembly; and
   vi. first and second lips on said lid portion defining the opening, said first lip extending outwardly of the lid generally perpendicular to the general plane of the lid and said second lip extending generally parallel to the general plane of the lid inwardly of the opening.

2. A lid assembly in accordance with claim 1, wherein said valve member comprises a first cylindrical portion having a diameter substantially equal to that of the opening, a second cylindrical portion having a diameter substantially equal to the diameter of the opening defined by said first lip, a frusto-conical portion connected to a cylindrical portion connected to a frusto-conical portion closed by a domed end portion, the concavity of the end portion facing inwardly of said lid.

3. A lid assembly in accordance with claim 2, wherein the opening is covered inwardly of said lid by a perforated bowl for the protection of said valve member.

4. A lid assembly in accordance with claim 1, wherein said lid comprises a skirt, spaced from said outer lip, which is adapted to enclose the edge portion of the container, said inner lip having an inclined face which bears on the edge of the container and a face extending perpendicular to the general plane of said lid.

5. A lid assembly in accordance with claim 1, wherein said gripping means comprises a tab provided with an eye having a transversal bar which clips onto a nipple attached to the lid and provided with a groove for receiving said bar.

6. A lid assembly in accordance with claim 1, wherein in use of the lid assembly two annular chambers at intermediate pressure are defined, one chamber between said inner and outer lips and the other chamber between said first and second lips.

7. A lid assembly in accordance with claim 1, wherein said lid and valve member are moulded of plastics material and said connecting means is a tongue moulded integrally therewith.

8. A lid assembly for closing a container to be evacuated, the assembly comprising:
   i. a lid having a portion defining an opening and a skirt for surrounding the open end portion of a container to be closed by said assembly;
   ii. first and second lip means on said lid portion defining said opening and in said opening, said first lip means extending generally axially of the opening and said second lip means extending generally normal thereto;
   iii. a generally frusto-conical valve member for closing the opening and comprising a first cylindrical portion having a diameter substantially equal to that of the opening, a second cylindrical portion having a diameter substantially equal to that of the opening defined by said first lip means and a frusto-conical portion engageable by said second lip means, said first and second lip means delimiting a chamber which in use will be at a pressure intermediate that within the container and externally thereof;
   iv. means for connecting said valve member to said lid; and
   v. inner and outer lip means on said lid for engaging the edge of the open end of a container to be closed thereby, said inner and outer lip means delimiting a chamber which in use will be at a pressure intermediate that within the container and externally thereof.

* * * * *

UNITED STATES PATENT OFFICE
CERTIFICATE OF CORRECTION

Patent No. 3,854,618　　　　　　　　　Dated December 17, 1974

Inventor(s) Gino P. Beghini

It is certified that error appears in the above-identified patent and that said Letters Patent are hereby corrected as shown below:

Item [75] - Inventor's Name should read -- Gino P. Beghini --.

Signed and sealed this 4th day of March 1975.

(SEAL)
Attest:

RUTH C. MASON
Attesting Officer

C. MARSHALL DANN
Commissioner of Patents
and Trademarks